(12) United States Patent
Zernickel et al.

(10) Patent No.: US 6,318,516 B1
(45) Date of Patent: Nov. 20, 2001

(54) BEARING ARRANGEMENT FOR ACTUATING A BRAKE IN A BRAKE SYSTEM

(75) Inventors: Alexander Zernickel, Herzogenaurach; Johannes Lang, Oberreichenbach; Jurgen Hartmann, Gutenstetten, all of (DE)

(73) Assignee: Ina Walzlager Schaeffler oHG (DE)

(*) Notice: Subject to any disclaimer, the term of this patent is extended or adjusted under 35 U.S.C. 154(b) by 0 days.

(21) Appl. No.: 09/530,181

(22) PCT Filed: Oct. 7, 1998

(86) PCT No.: PCT/EP98/06379

§ 371 Date: Apr. 26, 2000

§ 102(e) Date: Apr. 26, 2000

(87) PCT Pub. No.: WO99/22157

PCT Pub. Date: May 6, 1999

(30) Foreign Application Priority Data

Oct. 24, 1997 (DE) .............................. 197 47 074

(51) Int. Cl.⁷ .................................................. F16D 65/36
(52) U.S. Cl. ...................... 188/157; 188/196 V; 188/162; 188/202; 192/84.6
(58) Field of Search ..................... 188/157, 162, 188/202, 196 D, 196 V, 71.9, 72.7, 72.8; 192/84.6, 94, 97; 475/333, 903

(56) References Cited

U.S. PATENT DOCUMENTS

| 2,325,099 | 7/1943 | Best . |
| 3,963,286 | 6/1976 | Stanley . |
| 4,218,102 | 8/1980 | Moser . |
| 4,576,057 | * 3/1986 | Saari .............................. 74/424.8 C |
| 5,829,557 | * 11/1998 | Halasy-Wimmer et al. ........ 188/162 |
| 5,971,110 | * 10/1999 | Martin ................................ 188/72.1 |

FOREIGN PATENT DOCUMENTS

| 2008386 | 9/1971 | (DE) . |
| 4021572 | 1/1991 | (DE) . |
| 19511287 | 1/1996 | (DE) . |
| 19605988 | 8/1997 | (DE) . |
| 19611910 | 10/1997 | (DE) . |
| 0249674 | 12/1987 | (EP) . |
| 0260368 | 3/1988 | (EP) . |
| 0597438 | 5/1994 | (EP) . |
| 0743470 | 11/1996 | (EP) . |

* cited by examiner

Primary Examiner—Christopher P. Schwartz
Assistant Examiner—Xuan Lan Nguyen
(74) Attorney, Agent, or Firm—Bierman, Muserlian and Lucas

(57) ABSTRACT

The inventive bearing arrangement for a device for activating a vehicle brake has a central threaded spindle (2) which is secured against torsion in a fixed housing (1) and which is arranged in such a way that it can be displaced up to a brake disk (3) of the vehicle and from thereon axially. The inventive arrangement is also provided with an inner ring (5) which concentrically surrounds the threaded spindle (2) together with roll bodies. Said inner ring (5) is coupled with a rotating rotor of an electromotor (7) at the front and is supported with the same in the housing (1) by an axial roller bearing and a radial roller bearing so that it can rotate. According to the invention, the axial roller bearing of the inner ring (5) is made up of a planetary gear with several roll bodies serving as planets. Said roll bodies are situated between the inner ring (5) and a bore wall (8) of the housing (1) which is axial to the inner ring (5). This reduces the friction losses of the axial roller bearing.

3 Claims, 1 Drawing Sheet

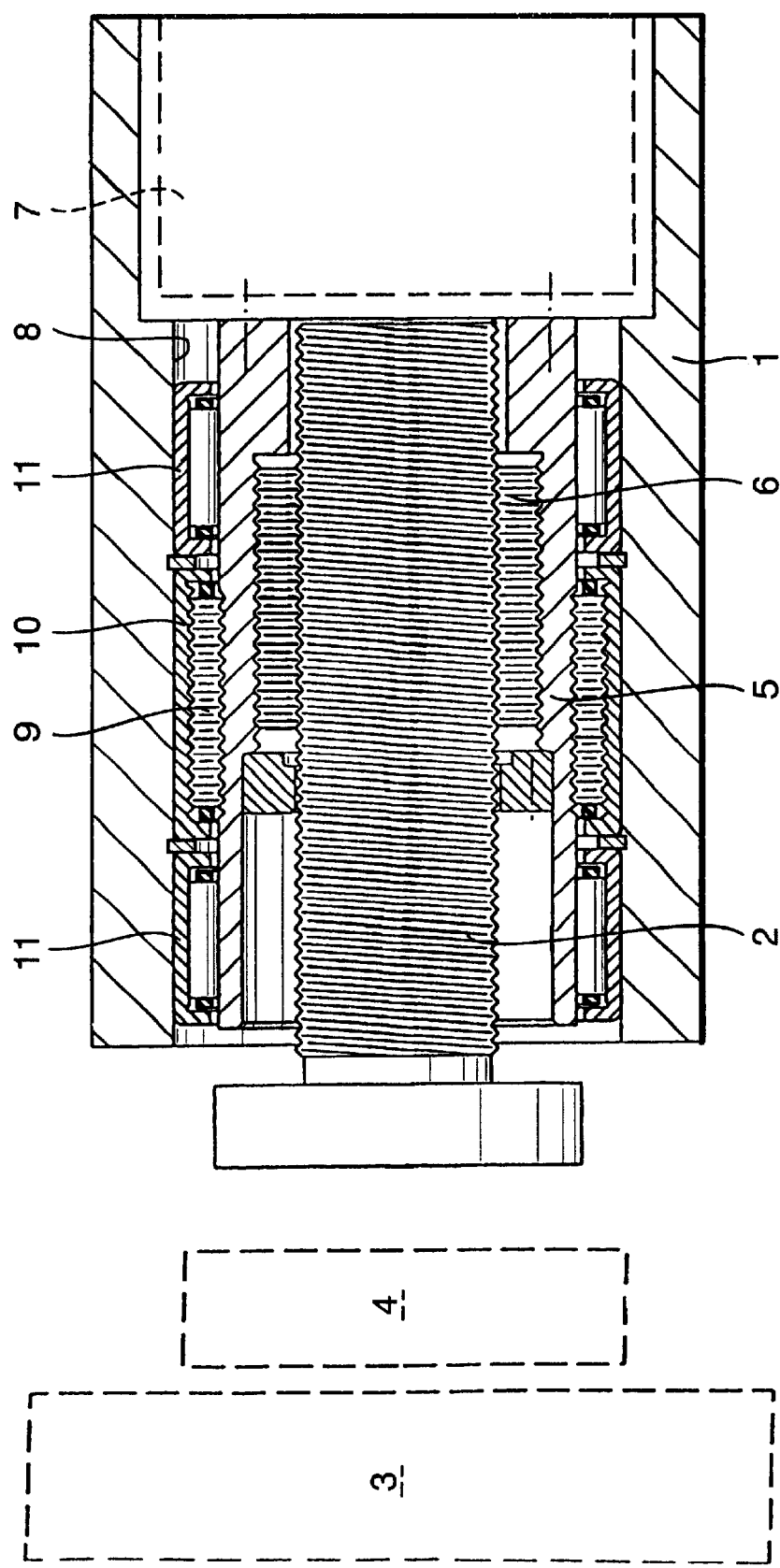

BEARING ARRANGEMENT FOR ACTUATING A BRAKE IN A BRAKE SYSTEM

FIELD OF THE INVENTION

The invention concerns a bearing arrangement comprising a central threaded spindle which is arranged in a stationary housing, and an inner ring which, together with rolling elements, concentrically surrounds the threaded spindle, said ring being arranged for rotation in the housing through a thrust rolling bearing that is constituted by a planet drive which comprises a plurality of rolling elements forming planets that are arranged between the inner ring and a bore wall of the housing coaxial to the inner ring.

BACKGROUND OF THE INVENTION

In a bearing arrangement of the pre-cited type known from EP-A-0 249 674, the inner ring and the threaded spindle can rotate in a stationary housing. A rotary drive independent from the rolling elements is not provided for the inner ring and neither can it be accommodated because the spaces of the housing adjacent to the inner ring are occupied by roller carrier rings and are closed.

A bearing arrangement disclosed in EP-OS-0 743 470 uses a planetary transmission for converting the rotary motion of a rotor of a motor into a sliding motion of a spindle that actuates a brake. This planetary transmission permits the transmission of a large force to the brake disc by a small forward movement of the spindle due to the fact that the spindle has a fine thread with a very small thread pitch while the inner ring, which is configured as a spindle nut, has a coarse thread. The rolling elements are configured as roller bodies and are situated in the annular space between the spindle and the spindle nut. They circle round the spindle as planets during the rotation of the spindle nut and mesh with the threads of the spindle and the spindle nut and therefore require two different threads, a fine thread for meshing with the spindle and a coarse thread for meshing with the spindle nut. This arrangement therefore has the drawback of being very complicated and expensive.

The prior art inner ring configured as a spindle nut is surrounded by a pot-shaped brake piston attached to the threaded spindle. During the axial motion of the threaded spindle, the cylindrical wall of the brake piston slides with its inner surface along the inner ring and with its outer surface along the inner wall of the bore of the stationary housing in which these components are arranged. This results in a considerable loss of energy due to friction.

The mounting of the inner ring in the housing is effected with the help of the coupled rotor of the electromotor, said rotor comprising two ball bearings configured as radial bearings and one roller bearing configured as a thrust bearing.

SUMMARY OF THE INVENTION

The object of the invention is to create a bearing arrangement for the actuating device of the vehicle brake which permits a reduction of friction losses and thus improves the overall efficiency.

This object is achieved according to the invention by the fact that, in the bearing arrangement, the threaded spindle is secured against rotation and is arranged for axial displacement toward and away from a brake disc of a vehicle brake, said inner ring is coupled at one end to the rotatable rotor of an electromotor and is additionally retained for rotation with this rotor in the housing through a radial rolling bearing which is constituted by two needle roller bearings whose needle roller bushings bear against the bore wall and are arranged adjacent to ends of an outer ring of the thrust bearing.

The use of two needle roller bearings for the radial mounting of the inner ring has the advantage that the buckling resistance of the inner ring is enhanced. A further advantage of a thrust bearing of this type in which the thrust force is transmitted by a plurality of planets is that the moment of friction of the bearing, especially in the case of very high thrust loads, is substantially smaller than in comparable conventional thrust bearings. The reason for this is that the contact pressure occurring in a conventional thrust bearing is very much higher.

The planets of the thrust bearings can be balls for which the inner ring and the bore wall comprise raceways made as grooves that are circular in peripheral direction and arc-shaped in longitudinal section.

But the planets of the thrust rolling bearing may also be rollers having circular grooves extending in peripheral direction and meshing with corresponding circular grooves of the inner ring and of the outer ring that is fixed on the bore wall of the housing.

The rolling elements that are arranged within the inner ring immediately surrounding the threaded spindle can be rollers having circular grooves extending in peripheral direction and meshing both with a thread of the inner ring and with the thread of the threaded spindle. However, it is also possible to use balls as rolling elements which would then mesh with a spiral ball raceway of the inner ring and with a corresponding raceway of the threaded spindle.

The embodiment of the invention comprising a threaded spindle and grooved planetary rollers for the axial mounting of its drive ring can also be designated as a "spindle-based thrust bearing".

Tests have shown that the moments of friction in the region of high thrust loads in the spindle-based thrust bearing lie clearly below the values of an angular contact thrust ball bearing. This is due to the fact that the thrust force in a spindle-based thrust bearing is distributed over many points of contact.

This results in smaller pressure ellipses than in angular contact thrust ball bearings. Additionally, due to the osculation between the raceways and the rolling elements in angular contact ball bearings, the magnitude of the pressure ellipses in angular contact ball bearings increases more strongly upon an increase of load than in the spindle-based thrust bearing whose planet flanks may have a crowned configuration.

BRIEF DESCRIPTION OF THE DRAWING

An example of embodiment of the invention is represented in the drawing and will be described more closely in the following. The drawing shows an axial section through a brake actuating device.

DETAILED DESCRIPTION OF THE DRAWING

A threaded spindle 2 is arranged for axial displacement but secured against rotation, in a stationary housing 1 of a brake actuating device. The threaded spindle 2 serves to act through a brake lining 4 on a brake disc 3. The axial displacement of the threaded spindle 2 is effected by a planet drive comprising an inner ring 5 coaxially surrounding the threaded spindle 2 and a plurality of axially parallel rollers 6 that are arranged as planets in the space between the inner ring 5 and the threaded spindle 2. On its periphery, each roller 6 comprises circular grooves with which it is in meshing engagement both with the thread of the threaded spindle 2 and with an inner thread that is formed on the inner surface of the inner ring 5.

The inner ring 5 is coupled at one end to the rotor of an electromotor 7 that is likewise arranged in the stationary housing 1. Therefore, when the electromotor 7 is active, the inner ring 5 therefore rotates about its longitudinal axis in the housing 1 and transmits its torque through the rollers 6 to the threaded spindle 2. Since the threaded spindle 2 cannot rotate about its axis, an axial displacement is imposed upon it due to the meshing of the rollers 6 with its thread.

The inner ring 5 is mounted both axially and radially in an axially parallel bore of the housing 1. According to the invention, the axial mounting is effected by a planet drive comprising a plurality of rollers 9 which are arranged in the annular space between the inner ring 5 and a bore wall 8 of the housing 1 around the inner ring 5 and thus act as planets. The rollers 9 are arranged axially parallel to the inner ring 5 and, similar to the rollers 6, also comprise circular grooves on their peripheries by which they mesh with corresponding circular grooves arranged on the peripheral surface of the inner ring 5. At the same time, the rollers 9 mesh by their circular grooves with corresponding circular grooves formed on an inner surface of an outer ring 10. The outer ring 10 bears against the bore wall 8 of the housing 1 and is fixed thereon both in axial and in peripheral direction.

Since the rollers 9 and the outer ring 10 comprise only circular grooves, i. e. they have no thread pitch, no axial displacement of the rollers 9 is caused by the rotation of the inner ring 5 which, on its outer surface, likewise comprises only circular grooves. However, a thrust force can be taken up through the individual flanks of the circular grooves of the rollers 9 and the outer ring 10.

The radial mounting of the inner ring 5 in the stationary housing 1 is effected by first and second needle roller bearings whose needle roller bushings 11 are arranged in the bore of the housing 1 axially in front of and behind the outer ring 10 and bear against the bore wall 8. This configuration of the radial mounting of the inner ring 5 with the help of needle roller bearings enhances the buckling resistance of the inner ring 5.

What is claimed is:

1. Bearing arrangement for actuating a brake system comprising a central threaded spindle (2), which is arranged in a stationary housing (1), secured against rotation and arranged for axial displacement toward and away from a brake disc (3) of said brake, further comprising an inner ring (5) which, together with first rolling elements, concentrically surrounds the threaded spindle (2), said ring (5) being arranged for rotation in the housing (1) through a thrust rolling bearing that is constituted by a planet drive which comprises a plurality of second rolling elements forming planets that are arranged between the inner ring (5) and a bore wall (8) of the housing (1) coaxial to the inner ring (5), said inner ring (5) is aligned at one end on the same axis to a rotatable rotor of an electromotor and is additionally retained for rotation with this rotor in the housing (1) through a radial rolling bearing which is constituted by two needle roller bearings whose needle roller bushings (11) bear against the bore wall (8) and the first one of these is arranged adjacent to one end of an outer ring (10) of the thrust bearing and the second one of these is arranged adjacent to the other end of the outer ring (10) of the thrust bearing.

2. Bearing arrangement according to claim 1, characterized in that the planets of the thrust rolling bearing are rollers (9) having circular grooves extending in peripheral direction and meshing with corresponding circular grooves of the inner ring (5) and of an outer ring (10) that is fixed on the bore wall (8) of the housing (1).

3. Bearing arrangement according to claim 1 characterized in that the rolling elements that are arranged within the inner ring (5) immediately surrounding the threaded spindle (2) are rollers (6) having circular grooves extending in peripheral direction and meshing both with the thread of the inner ring (5) and with the thread of the threaded spindle (2).

\* \* \* \* \*